United States Patent
Gärtner et al.

(10) Patent No.: US 7,285,074 B2
(45) Date of Patent: Oct. 23, 2007

(54) METHOD AND DEVICE FOR CONTROLLING A MOTOR VEHICLE DRIVE TRAIN

(75) Inventors: Volker Gärtner, Wurmberg (DE); Armin Tonn, Roth (DE); Alwin Becher, Zirndorf (DE); Klaus Leipnitz, Eckental (DE); Edgar Bothe, Peine (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 38 days.

(21) Appl. No.: 11/212,393

(22) Filed: Aug. 27, 2005

(65) Prior Publication Data

US 2006/0040777 A1 Feb. 23, 2006

Related U.S. Application Data

(63) Continuation of application No. PCT/EP2004/000782, filed on Jan. 29, 2004.

(30) Foreign Application Priority Data

Feb. 25, 2003 (DE) ................. 103 08 218

(51) Int. Cl.
*F16H 13/14* (2006.01)
*G01P 3/52* (2006.01)

(52) U.S. Cl. ............. 477/195; 477/907; 324/165

(58) Field of Classification Search ......... 477/195, 477/93, 907; 701/62; 324/62, 207.2, 207.21–2, 324/207.25, 173, 174, 165
See application file for complete search history.

(56) References Cited

U.S. PATENT DOCUMENTS

| | | | |
|---|---|---|---|
| 3,728,676 A | 4/1973 | Brown | |
| 4,586,401 A | 5/1986 | Nogle | |
| 4,586,502 A | 5/1986 | Bedi et al. | |
| 4,918,443 A | 4/1990 | Yoshida et al. | |
| 6,498,474 B1 * | 12/2002 | Turner | 324/207.25 |
| 2002/0175673 A1 | 11/2002 | Butzmann | |
| 2003/0085576 A1 * | 5/2003 | Kuang et al. | 290/40 C |
| 2005/0075775 A1 * | 4/2005 | Carlson et al. | 701/61 |

FOREIGN PATENT DOCUMENTS

| | | |
|---|---|---|
| DE | 30 41 041 A1 | 5/1982 |
| DE | 37 42 357 A1 | 6/1988 |
| DE | 019733465 A1 * | 2/1998 |
| DE | 198 49 494 C1 | 3/2000 |
| DE | 199 19 836 A1 | 11/2000 |
| DE | 101 18 806 A1 | 10/2002 |
| FR | 2 502 788 | 10/1982 |

OTHER PUBLICATIONS

English translation via EPO of WO0066916.*

* cited by examiner

*Primary Examiner*—Roger Pang

(57) ABSTRACT

A method and a device for controlling a motor vehicle drive train determine the direction of rotation of the drive train by evaluating sensor signals of a first sensor unit on the output side of the drive train. The first sensor unit includes a sensor wheel fastened to a rotatable component on the output side of the drive train and two rotational speed sensors which are fixed with respect to a housing and are placed circumferentially next to one another. In order to speed up the determination of the direction of rotation, the sensor signal of a second sensor unit on the input side of the drive train is evaluated. The second sensor unit includes a sensor wheel that is fastened to a rotatable component on the input side of the drive train and a rotational speed sensor that is fixed with respect to the housing.

11 Claims, 1 Drawing Sheet

METHOD AND DEVICE FOR CONTROLLING A MOTOR VEHICLE DRIVE TRAIN

CROSS-REFERENCE TO RELATED APPLICATION

This is a continuing application, under 35 U.S.C. § 120, of copending international application No. PCT/EP2004/000782, filed Jan. 29, 2004, which designated the United States; this application also claims the priority, under 35 U.S.C. § 119, of German patent application No. 103 08 218.2, filed Feb. 25, 2003; the prior applications are herewith incorporated by reference in their entirety.

BACKGROUND OF THE INVENTION

Field of the Invention

The invention relates to a method for controlling a motor vehicle drive train, in which the direction of rotation of the drive train is determined by evaluating sensor signals from a first sensor unit which is provided on the output side of the drive train and which includes a sensor wheel fastened to a rotatable component of the output side of the drive train and two rotational speed sensors which are provided circumferentially adjacent to one another, fixedly with respect to the housing, at an effective distance from the sensor wheel and are connected to an evaluation unit via signal lines. The evaluation unit determines the direction of rotation of the drive train from codirectional edge changes of the sensor signals. A safety and comfort function is activated and deactivated as a function of the determined direction of rotation of the drive train, a distinction being made between the rotational or driving states of a clockwise rotation of the drive train according to a forward movement of the motor vehicle, a counterclockwise rotation of the drive train according to a reverse movement of the motor vehicle and an undetected direction of rotation of the drive train according to a vehicle standstill or to an undetected vehicle movement.

The invention relates, furthermore, to a device for controlling a motor vehicle drive train, with a first sensor unit for determining the direction of rotation of the drive train, the first sensor unit including a sensor wheel fastened to a rotatable component of the output side of the drive train and two rotational speed sensors which are provided so as to be circumferentially adjacent to one another, fixedly with respect to the housing, at an effective distance from the sensor wheel and are connected to an evaluation unit via signal lines and through the use of which the direction of rotation of the drive train can be determined from codirectional edge changes of the assigned sensor signals.

Sensor units for determining the rotational speed of a rotatable component have been known for a long time. For example, sensor units of this type in an automated motor vehicle transmission are assigned in each case to a transmission shaft and are used for controlling the gear shifting or controlling the ratio of a transmission control, or in a motor vehicle are assigned in each case to a wheel hub and are used for the braking control of an antilock or traction control system. These are in this case usually magnetoelectric or inductoelectric rotational speed sensors which are provided in each case in the effective range of an assigned sensor wheel fastened to a rotatable component and in the event of a rotation of the sensor wheel generate a pulse signal or square wave signal which is transmitted via a signal line into an evaluation unit and is evaluated there into rotational speed information. The sensor wheel is usually configured as a toothed disk with a spur toothing, on which the assigned rotational speed sensor is arranged in the effective range of the spur toothing in an essentially radial orientation and fixedly with respect to the housing.

However, with a sensor unit of this type, only the amount of the rotational speed of the respective component can be determined, not the direction of rotation of the component. However, as is known, for example, from Published, Non-Prosecuted German Patent Application No. DE 30 41 041 A1, this is possible in a relatively simple way in that two rotational speed sensors are arranged in the effective range of a sensor wheel so as to be circumferentially adjacent to one another, in which case the time sequence of the pulses or of the codirectional edge changes, that is to say edge changes taking place in the same order, of the respective sensor signals can be evaluated in order to determine the direction of rotation of the respective component.

A drive train, which has transmission units or gear units with a tooth flank backlash or clearance, such as a pair of gearwheels of the selected gear of a manual transmission and a differential, and elastic components, such as a vibration damper of an engine clutch and a hardy disk, is, in principle, an oscillatory system. Consequently, during operation, torsional vibrations and the bridging of tooth flank clearance occur, which may lead to local changes in the direction of rotation. So that an unequivocal determination of the direction of rotation of the drive train can nevertheless be carried out, according to the prior art several codirectional edge changes have to be awaited when the sensor signals are evaluated in the evaluation unit, thus adversely leading to a time delay in the determination of the direction of rotation, and this possibly resulting in at least losses of comfort on account of a delay in the activation and deactivation of safety and comfort functions.

SUMMARY OF THE INVENTION

It is accordingly an object of the invention to provide a method and a device for controlling a motor vehicle drive train which overcomes the above-mentioned disadvantages of the heretofore-known methods and devices of this general type and through the use of which the determination of the direction of rotation of the drive train can be accelerated.

With the foregoing and other objects in view there is provided, in accordance with the invention, a method for controlling a motor vehicle drive train, which includes the steps of:

providing a first sensor unit on an output side of a drive train, the first sensor unit including a sensor wheel fastened to a rotatable component on the output side of the drive train and including two rotational speed sensors provided circumferentially adjacent to one another and fixed with respect to a housing, the two rotational speed sensors being provided at an effective distance from the sensor wheel of the first sensor unit and being connected to an evaluation unit via signal lines;

providing a second sensor unit on an input side of the drive train, the second sensor unit including a sensor wheel fastened to a rotatable component on the input side of the drive train and including a rotational speed sensor provided fixedly with respect to a housing, at an effective distance from the sensor wheel of the second sensor unit and being connected to the evaluation unit via a signal line;

evaluating sensor signals from the first sensor unit provided on the output side of the drive train and determining, by using the evaluation unit, a direction of rotation of the drive train from codirectional edge changes of the sensor signals;

evaluating a sensor signal from the second sensor unit for accelerating a determination of the direction of rotation of the drive train; and selectively activating and deactivating a safety and comfort function in dependence of a determined direction of rotation of the drive train wherein a distinction is made between rotational states or driving states of a clockwise rotation of the drive train corresponding to a forward movement of a motor vehicle, a counterclockwise rotation of the drive train corresponding to a reverse movement of the motor vehicle and an undetected direction of rotation of the drive train corresponding to one of a vehicle standstill and an undetected vehicle movement.

In other words, according to the invention, there is provided, a method for controlling a motor vehicle drive train, in which the direction of rotation of the drive train is determined through the use of an evaluation of the sensor signals from a first sensor unit which is disposed on the output side and which includes a sensor wheel fastened to a rotatable component of the output-side drive train and two rotational speed sensors which are disposed so as to be circumferentially adjacent to one another, fixedly with respect to the housing, at an effective distance from the sensor wheel and are connected to an evaluation unit via signal lines and through the use of which the direction of rotation of the drive train is determined from codirectional edge changes of the sensor signals, and in which method a safety and comfort function is activated and deactivated as a function of the determined direction of rotation of the drive train, a distinction being made between the rotational or driving states of clockwise rotation of the drive train according to a forward movement of the motor vehicle, counterclockwise rotation of the drive train according to a reverse movement of the motor vehicle and undetected direction of rotation of the drive train according to a vehicle standstill or to an undetected vehicle movement, wherein, in order to accelerate the determination of the direction of rotation, the sensor signal from an additional second sensor unit disposed on the drive side is evaluated, the additional second sensor unit including a sensor wheel fastened to a rotatable component of the input-side drive train and a rotational speed sensor which is disposed fixedly with respect to the housing at an effective distance from the sensor wheel and which is connected to the evaluation unit via a signal line.

Another mode of the invention includes determining the direction of rotation of the drive train after a determination of a single codirectional edge change of the two rotational speed sensors of the first sensor unit in case a rotation of the drive train is determined via the second sensor unit and an operative connection of the input side of the drive train to the output side of the drive train is closed.

A further mode of the invention includes determining the direction of rotation of the drive train after a determination of at least two codirectional edge changes of the two rotational speed sensors of the first sensor unit in case an operative connection of the input side of the drive train to the output side of the drive train is separated.

Another mode of the invention includes setting the direction of rotation of the drive train at undetected when one of the first and second sensor units determines a rotational speed below a given minimum rotational speed.

Yet another mode of the invention includes activating a hill holder function when a vehicle movement in a wrong direction is detected during a driving off operation.

A further mode of the invention includes deactivating an activated hill holder function when there is an undetected vehicle movement during a driving off operation.

Through the use of the additional second sensor unit, which, in an automated transmission, may advantageously be a sensor unit, present in any case on the drive-side drive train, i.e. the input side of the drive train, for a transmission control, the rotational speed of the drive train there is detected with higher resolution or higher sensitivity on account of the effective transmission ratio. Thus, a direction of rotation of the drive train which is determined through the use of the first sensor unit can be checked, and therefore detected more quickly as valid, with the aid of the sensor signal from the second sensor unit as a result of a plausibility check carried out in the common evaluation unit.

Consequently, with the operative connection of the input-side drive train to the output-side drive train being closed, in the case of a rotation of the drive train which is determined via the second sensor unit the direction of rotation of the drive train can be determined already after a single determined codirectional edge change of the two rotational speed sensors of the first sensor unit.

By contrast, with a separated, i.e. open, operative connection of the input-side drive train to the output-side drive train, this being the case in an idling operation, that is to say with the driving stage N selected in an automatic transmission and with no gear selected in a step-change transmission, the direction of rotation of the drive train should be determined only after at least two determined codirectional edge changes of the two rotational speed sensors of the first sensor unit, since in this case there is no effective relationship between the first sensor unit and the second sensor unit.

When a predetermined minimum rotational speed is undershot by the rotational speed determined via one of the two sensor units, the direction of rotation of the drive train is expediently set as being undetected, so that possibly activated safety and comfort functions can be deactivated in due time before a vehicle standstill and any change in direction of travel. It goes without saying that, in the determination of the rotational speed in the case of a separated operative connection of the input-side drive train to the output-side drive train, only the sensor signals from the first sensor unit are evaluated.

As an example of the use of a safety and comfort function, a hill holder function may be mentioned, which, in the case of a starting operation, i.e. a driving off operation, is expediently activated with a detected vehicle movement in the wrong direction and, after activation, is deactivated again when there is an undetected vehicle movement. In this context, what is to be understood by a vehicle movement in the wrong direction is a rolling back of the motor vehicle in the case of a driving off operation in a forward gear and a rolling forward of the motor vehicle in the case of a driving off operation in a reverse gear.

With the objects of the invention in view there is also provided, a drive train configuration, including:

a drive train having an input side with a rotatable component, an output side with a rotatable component, and having a housing;

a first sensor unit for determining a direction of rotation of the drive train, the first sensor unit including a sensor wheel fastened to the rotatable component of the output side of the drive train, the first sensor unit including two rotational speed sensors provided circumferentially adjacent to one another and fixed with respect to the housing, at an effective distance from the sensor wheel of the first sensor unit;

an evaluation unit;

signal lines connecting the two rotational speed sensors of the first sensor unit to the evaluation unit, the evaluation unit determining the direction of rotation of the drive train from codirectional edge changes of sensor signals from the two rotational speed sensors of the first sensor unit;

a second sensor unit for accelerating a determination of the direction of rotation of the drive train, the second sensor unit including a sensor wheel fastened to the rotatable component of the input side of the drive train, the second sensor unit including a rotational speed sensor provided fixedly with respect to the housing, at an effective distance from the sensor wheel of the second sensor unit; and a further signal line connecting the rotational speed sensor of the second sensor wheel to the evaluation unit.

With the objects of the invention in view there is also provided, in combination with a drive train having an input side with a rotatable component, an output side with a rotatable component, and having a housing, a device for controlling the drive train, including:

a first sensor unit for determining a direction of rotation of the drive train, the first sensor unit including a sensor wheel fastened to the rotatable component of the output side of the drive train, the first sensor unit including two rotational speed sensors provided circumferentially adjacent to one another and fixed with respect to the housing, at an effective distance from the sensor wheel of the first sensor unit;

an evaluation unit;

signal lines connecting the two rotational speed sensors of the first sensor unit to the evaluation unit, the evaluation unit determining the direction of rotation of the drive train from codirectional edge changes of sensor signals from the two rotational speed sensors of the first sensor unit;

a second sensor unit for accelerating a determination of the direction of rotation of the drive train, the second sensor unit including a sensor wheel fastened to the rotatable component of the input side of the drive train, the second sensor unit including a rotational speed sensor provided fixedly with respect to the housing, at an effective distance from the sensor wheel of the second sensor unit; and a further signal line connecting the rotational speed sensor of the second sensor wheel to the evaluation unit.

In other words, according to the invention, there is provided, a device for controlling a motor vehicle drive train, with a first sensor unit for determining the direction of rotation of the drive train, the first sensor unit including a sensor wheel fastened to a rotatable component of the output-side drive train and two rotational speed sensors which are disposed so as to be circumferentially adjacent to one another, fixedly, i.e. stationary, with respect to the housing, at an effective distance from the sensor wheel and are connected to an evaluation unit via signal lines and through the use of which the direction of rotation of the drive train can be determined from codirectional edge changes of the assigned sensor signals, wherein, in order to accelerate the determination of the direction of rotation, an additional second sensor unit is provided, which includes a sensor wheel fastened to a rotatable component of the input-side drive train and a rotational speed sensor which is disposed fixedly, i.e. stationary, with respect to the housing at an effective distance from the sensor wheel and which is connected to the evaluation unit via a signal line.

According to another feature of the invention, the drive train includes an automated transmission with a transmission control sensor unit provided on the input side of the drive train; and the transmission control sensor unit is used as the second sensor unit.

According to yet another feature of the invention, the drive train includes a transmission with an output shaft; and the first sensor unit is provided at the output shaft of the transmission.

According to a further feature of the invention, the drive train includes a transmission with an input shaft; and the second sensor unit is provided at the input shaft of the transmission.

The above described device provides a relatively simple and cost-effective solution, particularly when, in an automated transmission, a sensor unit, present in any case on the input-side drive train, of a transmission control is used as the second sensor unit.

In order to position the sensor units closely to one another and in a space-saving way, also with a view to as short signal lines as possible, the first sensor unit is advantageously disposed at an output shaft of the transmission and the second sensor unit is expediently disposed at an input shaft of the transmission.

Other features which are considered as characteristic for the invention are set forth in the appended claims.

Although the invention is illustrated and described herein as embodied in a method and device for controlling a motor vehicle drive train, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
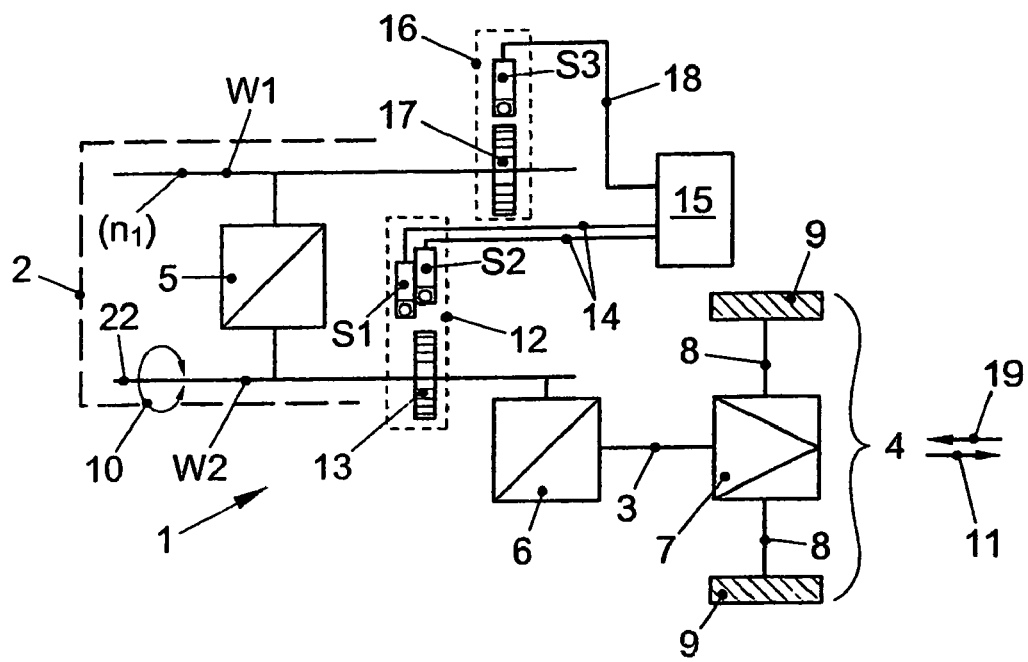
FIG. 1 is a schematic view of a setup of the control device according to the invention.

Referring now to the figures of the drawings in detail and first, particularly, to FIG. 1 thereof, there is shown a drive train 1 of a motor vehicle with a transmission 2 which is permanently connected to a driving axle 4 via a drive shaft 3. An input shaft W1 of the transmission 2, into which input shaft a torque generated by an engine and a rotational movement are introduced when the engine clutch is closed, i.e. engaged, is connected to an output shaft W2 via a separable, i.e. disengageable, reduction gear 5. The reduction gear 5 is formed, in the case of a step-change transmission, which is assumed in the present case as the transmission 2, by the gearwheels of that gear of a plurality of existing gears which is engaged at that moment. However, the reduction gear 5 may also include the gearwheels of the just active transmission ratio step of an automatic transmission or the variator of a continuously variable transmission. The output shaft W2 of the transmission 2 is permanently connected to the differential 7 of the driving axle 4 via a deflection gear 6 and the drive shaft 3. The torque effective in the drive shaft 3 and the corresponding rotational movement, converted according to the effective transmission ratio of the differential 7, are transmitted into the driving wheels 9 of the driving axle 4 in each case via a half shaft 8.

There is therefore a fixed relation between the rotational speed $n_2$, the direction of rotation 10 and the torque of the output shaft W2 of the transmission 2 and the corresponding quantities at the driving wheels 9 of the driving axle 4. In particular, there is therefore a fixed relation between the direction of rotation 10 of the output shaft W2 and the direction of movement or direction of travel 11 of the motor vehicle. To determine the direction of movement 11 of the motor vehicle, a first sensor unit 12 is provided, which includes a sensor wheel 13 fastened rigidly and therefore corotatably to the output shaft W2 and two rotational speed sensors S1, S2 which are arranged so as to be circumferentially adjacent to one another, fixedly with respect to the housing, at an effective distance from the sensor wheel 13 and are connected to an evaluation unit 15 via signal lines 14. According to the invention, an additional second sensor unit 16 is provided, which includes a sensor wheel 17 fastened rigidly and therefore corotatably to the input shaft W1 and a rotational speed sensor S3 which is arranged fixedly with respect to the housing at an effective distance from the sensor wheel 17 and which is connected to the evaluation unit 15 via a signal line 18.

Figure 2:
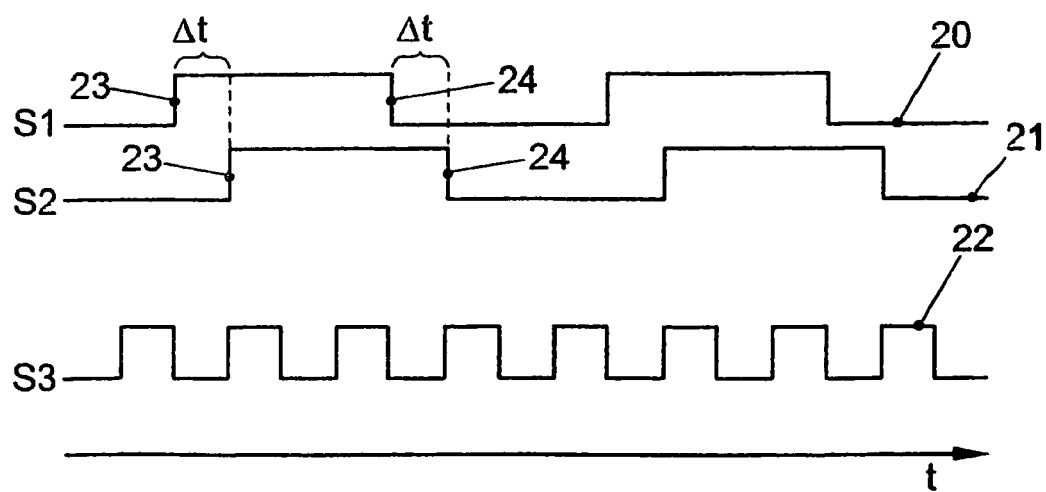
FIG. 2 is a graph illustrating a time profile of the sensor signals from rotational speed sensors of the control device according to FIG. 1.

In the case of a forward travel 19 of the motor vehicle, the profiles, illustrated in FIG. 2, of the sensor signals 20, 21, 22 from the rotational speed sensors S1, S2, S3 over the time t are obtained. On account of the contouring of the sensor wheel 13, rising and falling edge changes 23, 24 occur alternately, in such a way that the respective edge change 23, 24 is generated first on the first sensor S1 and with a certain time delay $\Delta t$ on the second sensor S2 of the first sensor unit 12. The order of the edge changes 23, 24 is evaluated in a way known per se in the evaluation unit 15 in order to determine the direction of rotation 10 of the output shaft W2 of the transmission 2 and consequently the direction of movement 11 of the motor vehicle. For this purpose, however, according to the prior art, because of possible torsional vibrations and the bridging of a tooth flank backlash or clearance in the drive train 1, several codirectional edge changes 23, 24, that is to say edge changes taking place in the same order, have to be awaited before the direction of movement 11 of the motor vehicle can be determined unequivocally. To accelerate the determination of the direction of rotation of the output shaft W2, therefore, there is provision, according to the invention, for additionally evaluating the sensor signal 22 from the sensor S3 of the second sensor unit 16 when a gear is engaged, that is to say with the reduction gear 5 closed, and consequently with a given fixed relation between the rotational movement or rotational speed $n_1$ of the input shaft W1 and the rotational movement or rotational speed $n_2$ of the output shaft W2. On account of the effective transmission ratio $n_1:n_2$ being greater than one, given by the reduction gear 5, between the input shaft W1 and the output shaft W2, if the sensor wheels 13, 17 are of a substantially identical type of construction the second sensor unit 16 has a higher time resolution, so that a rotational movement can be detected more quickly and the direction of rotation 10 of the output shaft W2 can be determined more reliably, and therefore more quickly, in conjunction with the sensor signals 20, 21 from the sensors S1, S2 of the first sensor unit 12, even after one edge change 23, 24.

In an automated gear shift transmission, each transmission shaft is in any case equipped with a sensor unit for determining the shaft's rotational speed as an integral part of a transmission control, so that in this case, expediently, that sensor unit of the transmission control which is assigned to the input shaft W1 is used additionally as the second sensor unit 16 of the present drive train control. After a detected direction of movement or direction of travel of the motor vehicle, a safety and comfort function, such as, for example, a hill holder function, can be activated or deactivated. By virtue of the device according to the invention and the corresponding method, a marked improvement in the drive train control is achieved in a relatively simple and cost-effective way.

We claim:

1. A method for controlling a motor vehicle drive train, the method which comprises:
   providing a first sensor unit on an output side of a drive train, the first sensor unit including a sensor wheel fastened to a rotatable component on the output side of the drive train and including two rotational speed sensors provided circumferentially adjacent to one another and fixed with respect to a housing, the two rotational speed sensors being provided at an effective distance from the sensor wheel of the first sensor unit and being connected to an evaluation unit via signal lines;
   providing a second sensor unit on an input side of the drive train, the second sensor unit including a sensor wheel fastened to a rotatable component on the input side of the drive train and including a rotational speed sensor provided fixedly with respect to a housing, at an effective distance from the sensor wheel of the second sensor unit and being connected to the evaluation unit via a signal line;
   evaluating sensor signals from the first sensor unit provided on the output side of the drive train and determining, by using the evaluation unit, a direction of rotation of the drive train from codirectional edge changes of the sensor signals;
   evaluating a sensor signal from the second sensor unit for accelerating a determination of the direction of rotation of the drive train; and
   selectively activating and deactivating a safety and comfort function in dependence of a determined direction of rotation of the drive train wherein a distinction is made between one of rotational states and driving states of a clockwise rotation of the drive train corresponding to a forward movement of a motor vehicle, a counter-clockwise rotation of the drive train corresponding to a reverse movement of the motor vehicle and an undetected direction of rotation of the drive train corresponding to one of a vehicle standstill and an undetected vehicle movement.

2. The method according to claim 1, which comprises determining the direction of rotation of the drive train after a determination of a single codirectional edge change of the two rotational speed sensors of the first sensor unit in case a rotation of the drive train is determined via the second sensor unit and an operative connection of the input side of the drive train to the output side of the drive train is closed.

3. The method according to claim 1, which comprises determining the direction of rotation of the drive train after a determination of at least two codirectional edge changes of the two rotational speed sensors of the first sensor unit in case an operative connection of the input side of the drive train to the output side of the drive train is separated.

4. The method according to claim 1, which comprises setting the direction of rotation of the drive train at undetected when one of the first and second sensor units determines a rotational speed below a given minimum rotational speed.

5. The method according to claim 1, which comprises activating a hill holder function when a vehicle movement in a wrong direction is detected during a driving off operation.

6. The method according to claim 1, which comprises deactivating an activated hill holder function when there is an undetected vehicle movement in a driving off operation.

7. A drive train configuration, comprising:
a drive train having an input side with a rotatable component, an output side with a rotatable component, and having a housing;
a first sensor unit for determining a direction of rotation of said drive train, said first sensor unit including a sensor wheel fastened to said rotatable component of said output side of said drive train, said first sensor unit including two rotational speed sensors provided circumferentially adjacent to one another and fixed with respect to said housing, at an effective distance from said sensor wheel of said first sensor unit;
an evaluation unit;
signal lines connecting said two rotational speed sensors of said first sensor unit to said evaluation unit, said evaluation unit determining the direction of rotation of said drive train from codirectional edge changes of sensor signals from said two rotational speed sensors of said first sensor unit;
a second sensor unit for accelerating a determination of the direction of rotation of said drive train, said second sensor unit including a sensor wheel fastened to said rotatable component of said input side of said drive train, said second sensor unit including a rotational speed sensor provided fixedly with respect to said housing, at an effective distance from said sensor wheel of said second sensor unit; and
a further signal line connecting said rotational speed sensor of said second sensor wheel to said evaluation unit.

8. The drive train configuration according to claim 7, wherein:
said drive train includes an automated transmission with a transmission control sensor unit provided on said input side of said drive train; and
said transmission control sensor unit is used as said second sensor unit.

9. The drive train configuration according to claim 7, wherein:
said drive train includes a transmission with an output shaft; and
said first sensor unit is provided at said output shaft of said transmission.

10. The drive train configuration according to claim 7, wherein:
said drive train includes a transmission with an input shaft; and
said second sensor unit is provided at said input shaft of said transmission.

11. In combination with a drive train having an input side with a rotatable component, an output side with a rotatable component, and having a housing, a device for controlling the drive train, comprising:
a first sensor unit for determining a direction of rotation of the drive train, said first sensor unit including a sensor wheel fastened to the rotatable component of the output side of the drive train, said first sensor unit including two rotational speed sensors provided circumferentially adjacent to one another and fixed with respect to the housing, at an effective distance from said sensor wheel of said first sensor unit;
an evaluation unit;
signal lines connecting said two rotational speed sensors of said first sensor unit to said evaluation unit, said evaluation unit determining the direction of rotation of the drive train from codirectional edge changes of sensor signals from said two rotational speed sensors of said first sensor unit;
a second sensor unit for accelerating a determination of the direction of rotation of the drive train, said second sensor unit including a sensor wheel fastened to the rotatable component of the input side of the drive train, said second sensor unit including a rotational speed sensor provided fixedly with respect to the housing, at an effective distance from said sensor wheel of said second sensor unit; and
a further signal line connecting said rotational speed sensor of said second sensor wheel to said evaluation unit.

* * * * *